(12) United States Patent
Ono (10) Patent No.: US 11,881,895 B2
(45) Date of Patent: Jan. 23, 2024

(54) OPTICAL TRANSPONDER

(71) Applicant: Nippon Telegraph and Telephone Corporation, Tokyo (JP)

(72) Inventor: Hirotaka Ono, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 114 days.

(21) Appl. No.: 17/618,827

(22) PCT Filed: Jun. 27, 2019

(86) PCT No.: PCT/JP2019/025742
§ 371 (c)(1),
(2) Date: Dec. 13, 2021

(87) PCT Pub. No.: WO2020/261520
PCT Pub. Date: Dec. 30, 2020

(65) Prior Publication Data
US 2022/0368423 A1    Nov. 17, 2022

(51) Int. Cl.
*H04B 10/291* (2013.01)
*H04B 10/077* (2013.01)

(52) U.S. Cl.
CPC ......... *H04B 10/291* (2013.01); *H04B 10/077* (2013.01)

(58) Field of Classification Search
CPC ............................ H04B 10/291; H04B 10/077
(Continued)

(56) References Cited

U.S. PATENT DOCUMENTS 11,264,776 B2 * 3/2022 Le Taillandier De Gabory .......... H01S 3/06737
2019/0140418 A1 * 5/2019 Le Taillandier De Gabory .......... H01S 3/06754

FOREIGN PATENT DOCUMENTS

JP  H07-168146 A  7/1995
JP  H08-171020 A  7/1996
(Continued)

OTHER PUBLICATIONS

Haitao Chen, *Development of an 80 Gbit/s InP-based Mach-Zehnder Modulator*, literature, Oct. 26, 2007, pp. 1-180.

*Primary Examiner* — Mohammad R Sedighian
(74) *Attorney, Agent, or Firm* — Workman Nydegger (57) ABSTRACT

An optical repeater device includes an amplifier module and a monitoring control circuit. The optical amplifier module includes an amplifier optical circuit including a plurality of amplification cores that amplify signal light propagating through different cores, and an optical amplifier control circuit that receives detection results from optical detectors at a plurality of signal light waveguide points of the amplifier optical circuit and generates a control signal directed to an excitation light source. The monitoring control circuit includes a reception unit that receives monitoring control channel light, a transmission unit that transmits the monitoring control channel light, an information determination unit that determines whether the monitoring control information received from the reception unit is for its own device or for another device, and a monitoring control unit that receives monitoring control information from the other device via the reception unit and the information determination unit and transmits the monitoring control information of its own device to the other device via the transmission unit and the information determination unit.

4 Claims, 7 Drawing Sheets

(58) Field of Classification Search
USPC .......................................................... 398/177
See application file for complete search history.

(56) References Cited

FOREIGN PATENT DOCUMENTS

| | | | | |
|---|---|---|---|---|
| JP | 2015204467 A | * | 11/2015 | ............. H04L 12/70 |
| JP | 2016-200676 A | | 12/2016 | |
| JP | 63-39965 B2 | | 5/2018 | |
| WO | WO 2022/091187 A1 | * | 5/2022 | ........... H04B 10/291 |

* cited by examiner

OPTICAL TRANSPONDER

TECHNICAL FIELD

The present invention relates to an optical repeater device that is used in an optical communication system.

TECHNICAL FIELD

In a large-capacity optical transmission system, a wavelength division multiplexing (WDM) transmission scheme in which a plurality of signal lights having different wavelengths are multiplexed and transmitted on one fiber is adopted. A long-distance WDM transmission device transmits signal light over a required distance while optically amplifying attenuated signal light using an optical repeater device in which an erbium-doped fiber amplifier (EDFA) is used.

Figure 1:
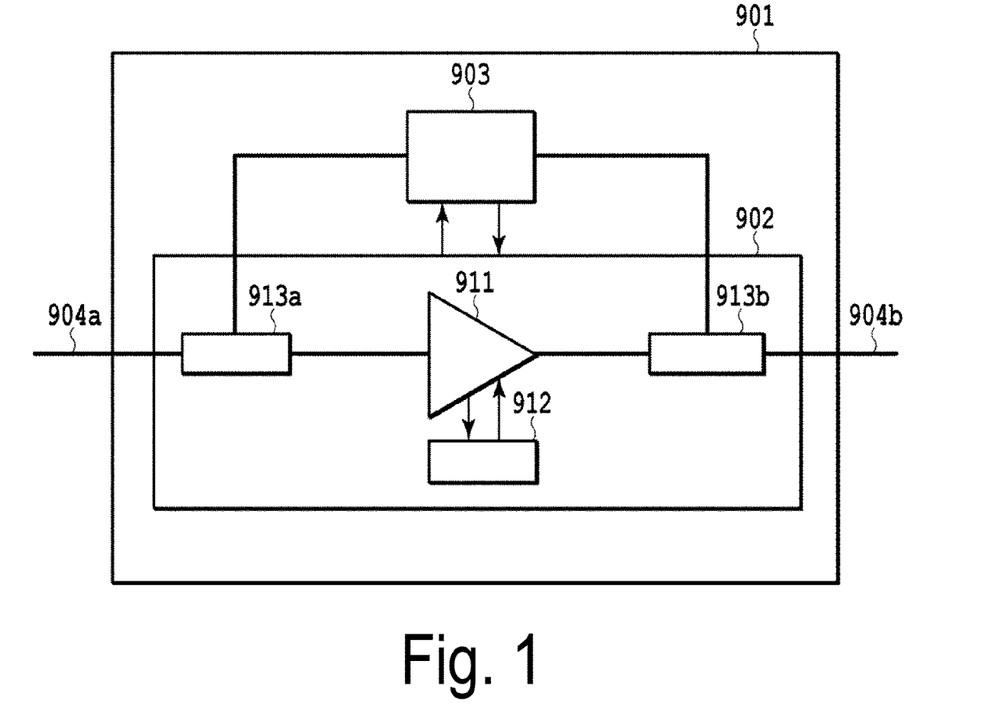
FIG. 1 is a diagram illustrating a configuration of an optical repeater device of the related art.

FIG. 1 illustrates a configuration of an optical repeater device of the related art. An optical repeater device 901 includes an optical amplifier module 902 and a monitoring control circuit 903. The same type of fibers 904a and 904b as transmission fibers of an optical transmission system to which the optical repeater device 901 is connected are used as an input and an output.

The optical amplifier module 902 includes an amplifier optical circuit 911, and an optical amplifier control circuit 912 that receives detection results from photodetectors at a plurality of signal light waveguide points of the amplifier optical circuit 911 and adjusts an output of an excitation light source. Here, signal light that propagates information to be transmitted by the optical transmission system at a transmitting end and a receiving end is referred to as main signal channel light. The optical amplifier module 902 further includes a multiplexer and demultiplexer 913a that demultiplexes, from the main signal channel light, monitoring control channel light for transmitting monitoring control information at a wavelength different from that of the main signal channel light and outputs the monitoring control channel light to a fiber directed to the monitoring control circuit 903, and a multiplexer and demultiplexer 913b that multiplexes the monitoring control channel light with the main signal channel light and outputs resultant light from the optical repeater device.

Figure 2:
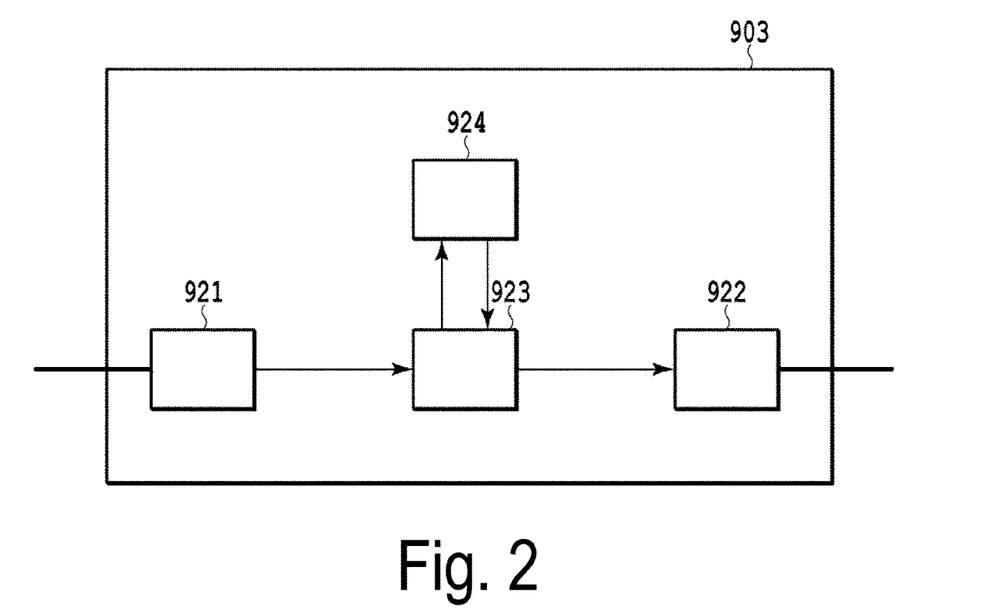
FIG. 2 is a diagram illustrating a configuration of a monitoring control circuit that is used in the optical repeater device of the related art.

FIG. 2 illustrates a configuration of the monitoring control circuit that is used in the optical repeater device of the related art. The monitoring control circuit 903 includes a monitoring control channel reception unit 921 that receives the monitoring control channel light, a monitoring control channel transmission unit 922 that transmits the monitoring control channel light, an information determination unit 923 that determines whether the monitoring control information transmitted by the monitoring control channel light is for its own device or for another device, and a monitoring control unit 924 (see, for example, Patent Literature 1).

The monitoring control unit 924 receives information on monitoring items of its own device from the optical amplifier module 902, and transmits control information to the optical amplifier module 902. Further, the monitoring control unit 924 receives the monitoring control information from the other device via the reception unit 921, and transmits the monitoring control information of its own device to the other device via the transmission unit 922. Examples of monitoring items of its own device include an optical power of each monitor point, a temperature for an amplification fiber, and an excitation LD output, drive current, and temperature. Further, an example of information received from another device or transmitted to another device includes the number of main signal channel lights (the number of wavelengths).

Such an optical repeater device is one device constituting an optical transmission device, and may be called an optical repeater line card.

In recent years, development of a multi-core optical transmission system using a multi-core fiber having a plurality of cores in one optical fiber as a transmission line has been progressing in order to dramatically increase a transmission capacity of the optical transmission system. By causing each core of the multi-core fiber to propagate a wavelength division multiplexing (WDM) signal for transmitting different information, it is possible to markedly increase the transmission capacity as compared with a case of the related art in which an optical fiber having one core is used as a transmission line. In a long-distance multi-core optical transmission system, an optical repeater device for amplifying signal light of which the intensity becomes lower during transmission is required as in an optical transmission system using a single core fiber as a transmission line.

There are the following types of EDFAs that are used for an optical repeater device applied to a multi-core optical transmission system.

1) Multi-core EDFA (MC-EDFA) using a multi-core erbium-doped fiber, which is a core-excited MC-EDFA including an excitation light source for each core (see, for example, Non Patent Literature 1)
2) Cladding-excited MC-EDFA in which, in an MC-EDFA, a multi-core erbium-doped fiber (MC-EDF) has a double-cladding structure, and one or a smaller number of excitation light sources than the number of cores a plurality or all cores by cladding excitation are included (see, for example, Non Patent Literature 2)
3) Bundle-type EDFA in which a plurality of erbium-doped fibers (EDFs) are bundled (see, for example, Non Patent Literature 3)
4) Use of a plurality of EDFAs in parallel Here, media for amplifying signal light propagating through different cores of the multi-core fiber are different cores in 1) and 2), different fibers in 3), and different EDFAs in 4). These will be collectively referred to as "amplification waveguides".

An optical repeater device for a multi-core optical transmission system includes an optical amplifier module using such an EDFA, and a monitoring control circuit. In this case, when the monitoring control circuit is designed in the same manner as in the related art, the monitoring control circuit is required for each different amplification waveguide, which causes a problem in that the size and power consumption of the optical repeater device increase.

CITATION LIST

Patent Literature

Patent Literature 1: JP 8-237196 A

Non Patent Literature

Non Patent Literature 1: Y. Tsuchida et al., "Simultaneous 7-Core Pumped Amplification in Multicore EDF through Fibre Based Fan-in/out," in Proc. of ECOC 2012, paper Tu.4. F. 2.
Non Patent Literature 2: K. S. Abedin et al., "Cladding-pumped Erbium-doped Multicore Fiber Amplifier," Opt. Express, vol. 20, no. 18. pp. 20191-20200, 2012.

Non Patent Literature 3: M. Yamada et al., "Optical Fiber Amplifier Employing a Bundle of Reduced Cladding Erbium-doped Fibers," IEEE Photon. Technol. Lett., Vol. 24, no. 21, pp. 1910-1913, 2012.

SUMMARY OF THE INVENTION

An object of the present invention is to reduce the size and power consumption of an optical repeater device.

An optical repeater device according to an embodiment of the present invention includes an amplifier module and a monitoring control circuit. The optical amplifier module includes an amplifier optical circuit including a plurality of amplification cores that amplify signal light propagating through different cores, and an optical amplifier control circuit that receives detection results from optical detectors at a plurality of signal light waveguide points of the amplifier optical circuit and generates a control signal directed to an excitation light source. The monitoring control circuit includes a reception unit that receives monitoring control channel light, a transmission unit that transmits the monitoring control channel light, an information determination unit that determines whether the monitoring control information received from the reception unit is for its own device or for another device, and a monitoring control unit that receives monitoring control information from the other device via the reception unit and the information determination unit and transmits the monitoring control information of its own device to the other device via the transmission unit and the information determination unit. The monitoring control circuit collectively processes the monitoring control channel light for the respective different cores.

With this configuration, it is possible to reduce the size and power consumption of the optical repeater device and, as a result, to reduce the size and power consumption of an optical transmission device applied to a multi-core fiber transmission system.

DESCRIPTION OF EMBODIMENTS

Hereinafter, embodiments of the present invention will be described in detail with reference to the drawings.

First Embodiment

Figure 3:
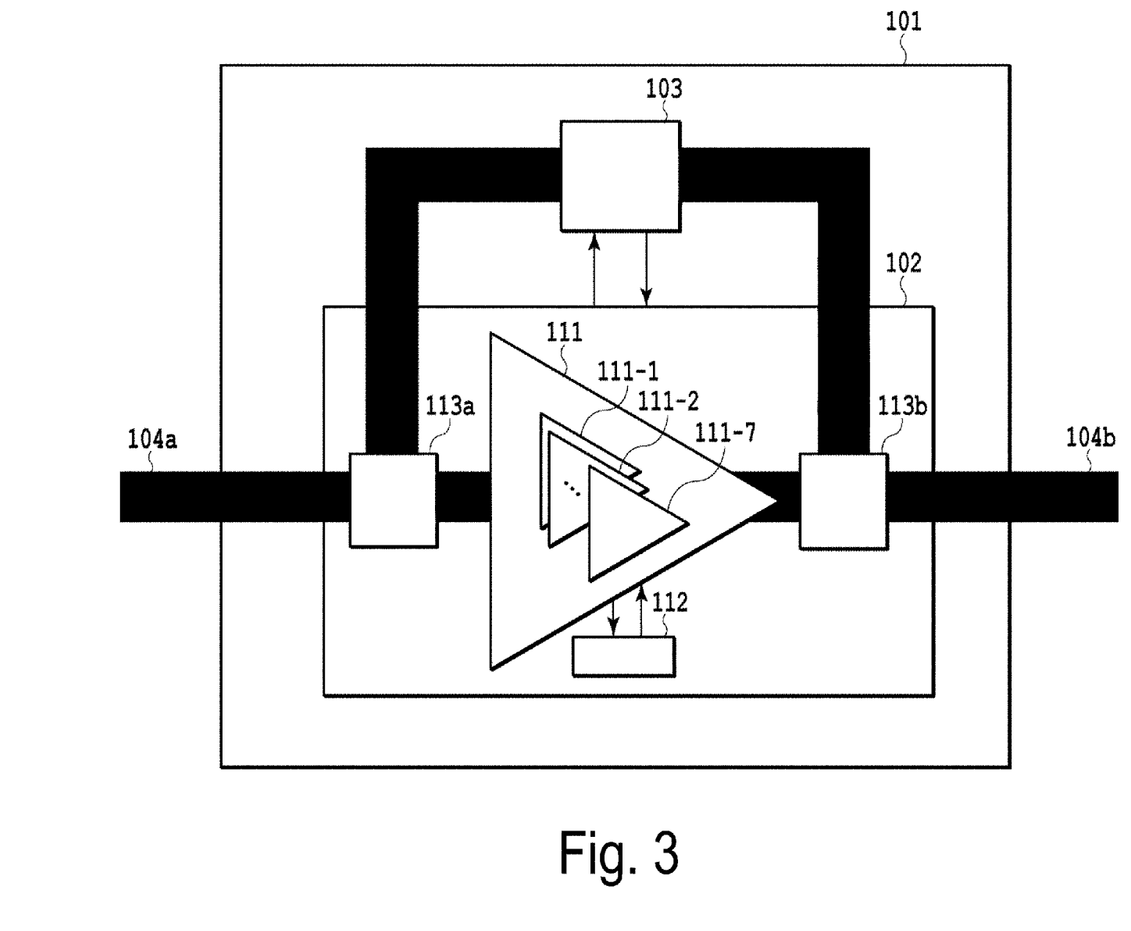
FIG. 3 is a diagram illustrating a configuration of an optical repeater device according to a first embodiment of the present invention.

FIG. 3 illustrates a configuration of an optical repeater device according to a first embodiment of the present invention. The optical repeater device of the first embodiment is an optical repeater device that is used in an optical transmission system that uses a multi-core fiber as a transmission fiber. An optical repeater device 101 includes an optical amplifier module 102 and a monitoring control circuit 103. The same types of fibers 104a and 104b as transmission fibers of an optical transmission system to which the optical repeater device 101 is connected are used as an input and an output.

The optical amplifier module 102 includes an amplifier optical circuit 111 and an optical amplifier control circuit 112, and further includes a multiplexer and demultiplexer 113a and a multiplexer and demultiplexer 113b. The optical amplifier control circuit 112 receives detection results from photodetectors at a plurality of signal light waveguide points of the amplifier optical circuit 111, and adjusts an output of an excitation light source. The multiplexer and demultiplexer 113a demultiplexes, from the main signal channel light, the monitoring control channel light that transmits the monitoring control information at a wavelength different from that of the main signal channel light, and outputs the monitoring control channel light to a fiber directed to the monitoring control circuit 103. The multiplexer and demultiplexer 113b multiplexes the monitoring control channel light with the main signal channel light and outputs resultant light from the optical repeater device.

The amplifier optical circuit 111 is a multi-core erbium-doped fiber amplifier (MC-EDFA) using a multi-core erbium-doped fiber (MC-EDF), and is a 7-core EDFA using a 7-core EDF in the present embodiment. In FIG. 3, it is schematically illustrated that the amplifier optical circuit 111 amplifies the signal light propagating through seven cores independently of each other using amplifiers 111-1 to 111-7. The 7-core EDF is a double-cladding fiber, and has a structure in which seven cores are disposed in an inner cladding. Excitation light propagates through the inner cladding and simultaneously excites erbium ions added to all the cores.

The optical amplifier control circuit 112 includes a drive circuit for an excitation light source (a 980 nm band multimode semiconductor laser) that generates excitation light to a double-cladding 7-core EDF. Further, the optical amplifier control circuit 112 receives detection information (a current or a voltage) from an optical power monitor (a photodetector) in the amplifier optical circuit 111, transmits the detection information to the monitoring control circuit 103, receives a control signal such as an excitation light source drive value from the monitoring control circuit, and controls the amplifier optical circuit 111.

A 7-core EDFA in which a single-cladding 7-core EDF or a bundled EDF in which seven single-core EDFs are bundled is used, and an excitation light source (a 980 nm band single-mode semiconductor laser) included for each core can be used as the amplifier optical circuit 111. Further, although an effect of reduction of the size of the optical repeater device is reduced, seven EDFAs of the related art can be used in parallel. When a bundled EDF is used and an EDFA of the related art is used, a fan-out that is a conversion device from a multi-core fiber to a single-core fiber is included at an input end of the amplifier optical circuit, and a fan-in that is a conversion device from a single-core fiber to a multi-core fiber is included at an output end of the amplifier optical circuit.

In the multiplexer and demultiplexers 113a and 113b, all of three ports are 7-core fibers. The multiplexer and demultiplexer 113a on the input side of the amplifier optical circuit 111 demultiplexes the monitoring control channel light to the monitoring control circuit 103 side for each core. The multiplexer and demultiplexer 113b on the output side of the amplifier optical circuit 111 multiplexes the monitoring control channel light with the main signal channel amplified by the amplifier optical circuit 111 for each core.

Figure 4:
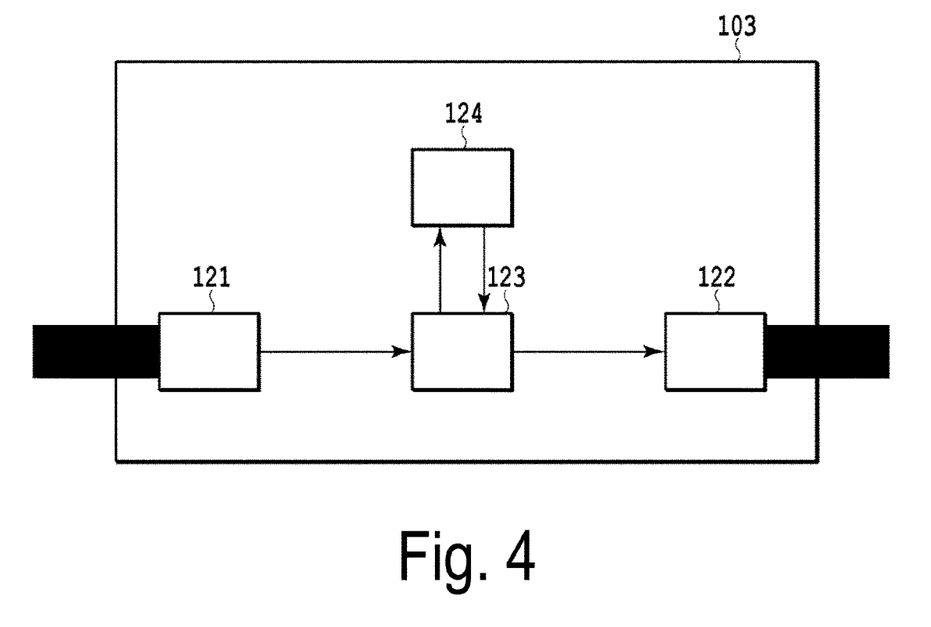
FIG. 4 is a diagram of a monitoring control circuit that is used in the optical repeater device of the first embodiment.

FIG. 4 illustrates a configuration of the monitoring control circuit that is used in the optical repeater device of the first embodiment. A monitoring control circuit 103 includes a monitoring control channel reception unit 121 that receives the monitoring control channel light, a monitoring control channel transmission unit 122 that transmits the monitoring control channel light, an information determination unit 123 that determines whether monitoring control information transmitted by the monitoring control light channel is for its own device or for another device, and a monitoring control unit 124.

The monitoring control unit 124 receives information on monitoring items of its own device from the optical amplifier module 102, and transmits control information to the optical amplifier module 102. Further, the monitoring control unit 124 receives the monitoring control information from another device via the reception unit 121 and the information determination unit 123, and transmits the monitoring control information of its own device to the other device via the transmission unit 122 and the information determination unit 123. Examples of monitoring items of its own device include an optical power of each monitor point, a fiber temperature for amplification, and an excitation LD output, drive current, and temperature. Further, wavelength information is received from another device or transmitted to another device.

The reception unit 121 receives the monitoring control channel light from each core of the 7-core fiber, time-multiplexes a monitoring control signal, and transmits a resultant monitoring control signal to the information determination unit 123. On the other hand, the transmission unit 122 time-divides the time-multiplexed monitoring control signal directed to each core sent from the information determination unit 123 and transmits a resultant signal to each core as monitoring control channel light. For example, in the case of a 155 Mbps monitoring control signal of each core, the reception unit 121 multiplexes the received 155.52 Mbps signal with 1088.64 Mbps and sends a resultant signal to the information determination unit. The transmission unit 122 divides the monitoring control signal multiplexed with 1088.64 Mbps into 155.52 Mbps for each core and transmits a resultant signal to each core.

The information determination unit 123 determines whether the monitoring control information received from the reception unit 121 is for its own device or for another device. When a monitoring instruction for its own device is detected, the monitoring control unit 124 collects in-optical repeater device information and transmits a monitoring control signal indicating the in-device information to the transmission unit 122.

The monitoring control unit 124 collects information on its own device described above, and collects information on each core in the amplifier optical circuit 111 in chronological order and transmits the monitoring control signal to the transmission unit 122.

According to the first embodiment, the optical repeater device shares a function of the monitoring control circuit among the respective cores to collectively process the monitoring control channel light for the respective different cores. Thus, it is possible to reduce the size of the optical repeater device by 65% and to reduce power consumption by 70%, as compared with a case in which monitoring control circuits of the related art corresponding to the number of cores are used.

Second Embodiment

Figure 5:
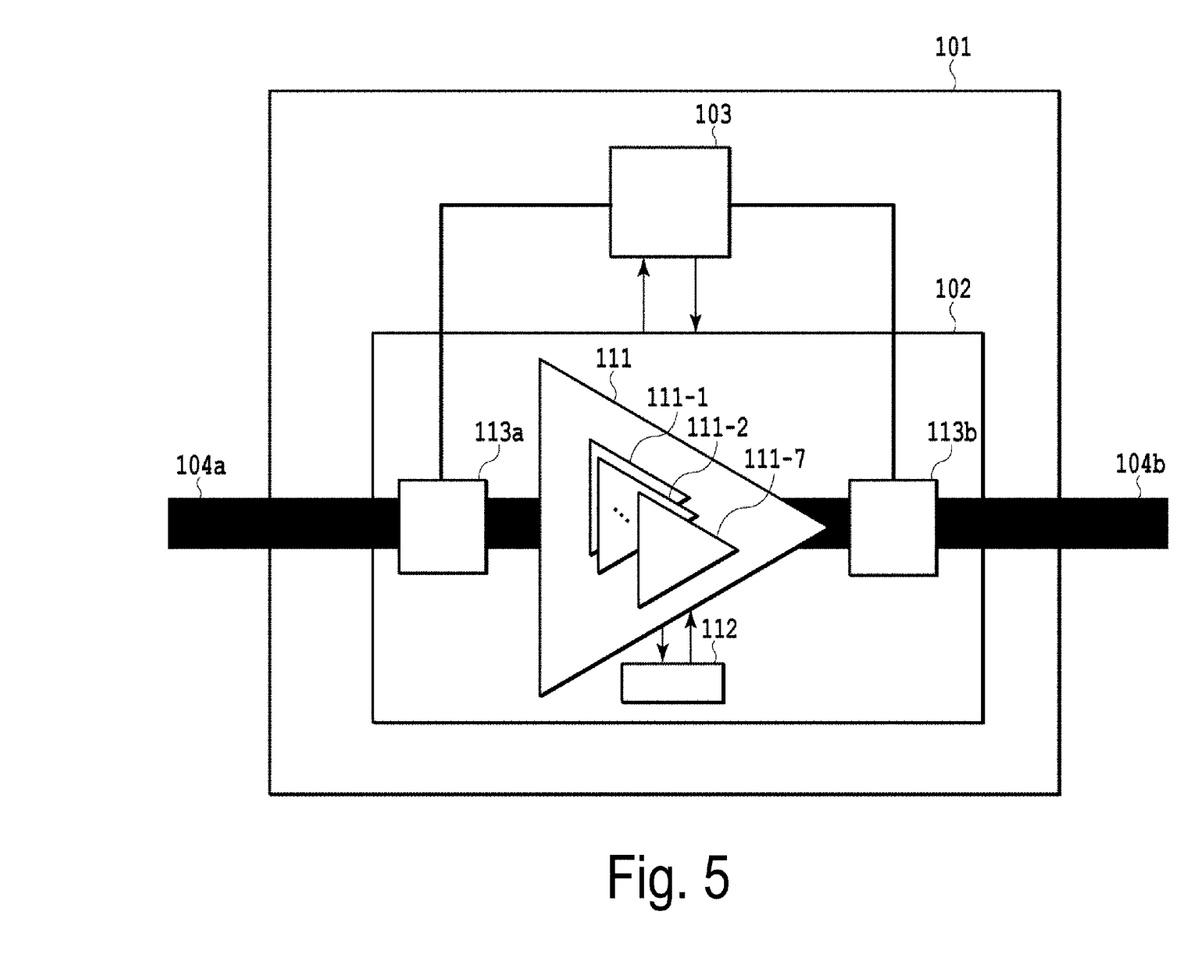
FIG. 5 is a diagram illustrating a configuration of an optical repeater device according to a second embodiment of the present invention.

FIG. 5 illustrates a configuration of an optical repeater device according to a second embodiment of the present invention. The optical repeater device of the second embodiment is applied to an optical transmission system in which monitoring control channel light of one core of a multi-core fiber transmits monitoring control signals of all the cores. An optical repeater device 101 includes an optical amplifier module 102 and a monitoring control circuit 103, and the respective components are the same as those of the optical repeater device of the first embodiment. A difference from the first embodiment is that the fiber connecting the monitoring control circuit 103 to the multiplexer and demultiplexers 113a and 113b is a single core fiber.

Figure 6:
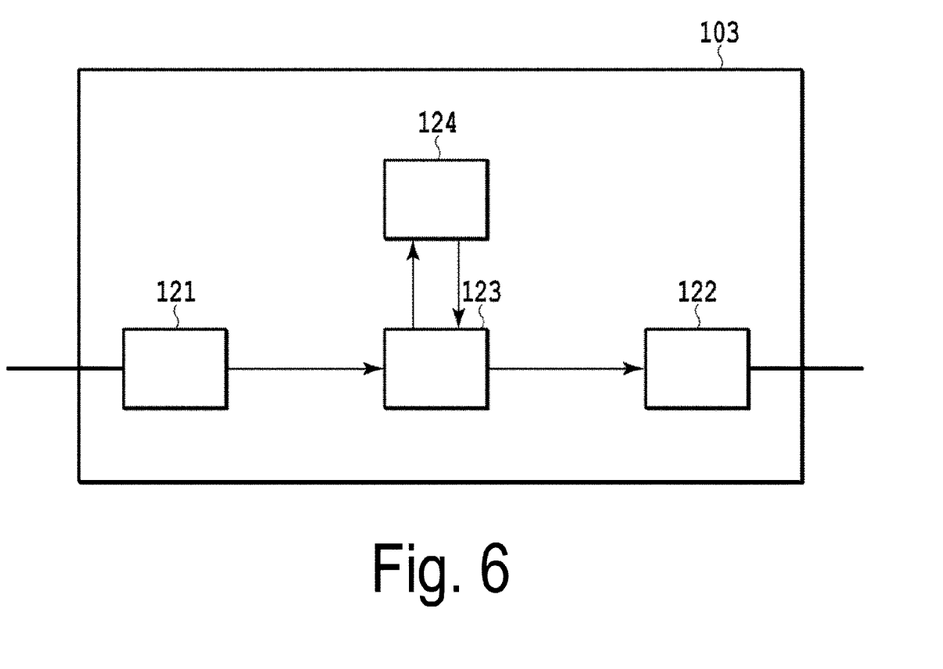
FIG. 6 is a diagram of a monitoring control circuit that is used in the optical repeater device of the second embodiment.

FIG. 6 illustrates a configuration of the monitoring control circuit that is used in the optical repeater device of the second embodiment. The multiplexer and demultiplexer 113a on the input side of the amplifier optical circuit 111 demultiplexes monitoring control channel light from one core of the multi-core fiber and transmits the monitoring control channel light to a reception unit 121 of the monitoring control circuit 103 via the single core fiber. The multiplexer and demultiplexer 113b on the output side of the amplifier optical circuit 111 multiplexes one monitoring control channel light from the transmission unit 122 with the main signal channel light amplified by the amplifier optical circuit 111 with respect to one core of the multi-core fiber.

As a result, the optical repeater device of the second embodiment shares a function of the monitoring control circuit among the respective cores. Thus, the size of the optical repeater device can be reduced by 75% and power consumption can be reduced by 75%, as compared with a case in which monitoring control circuits of the related art corresponding to the number of cores are used.

Third Embodiment

Figure 7:
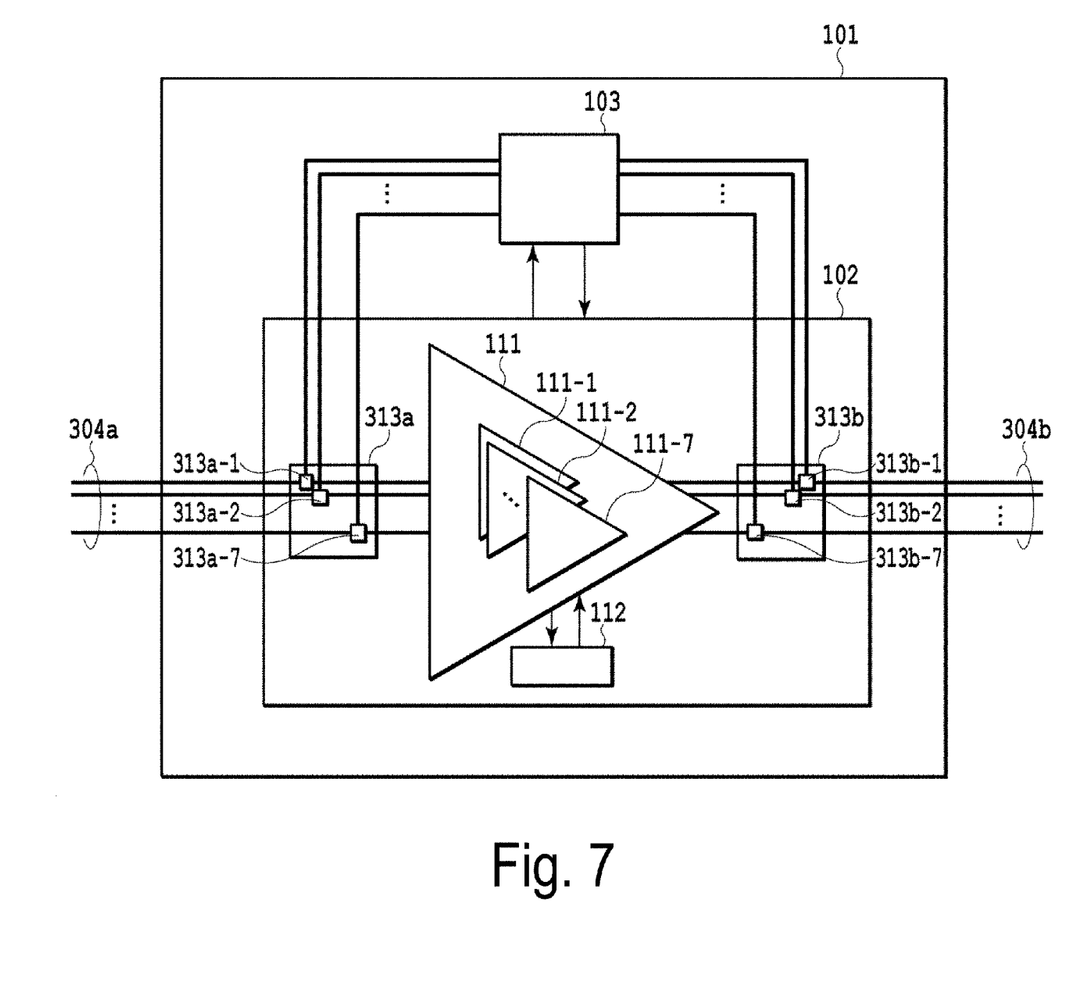
FIG. 7 is a diagram illustrating a configuration of an optical repeater device according to a third embodiment of the present invention.

FIG. 7 illustrates a configuration of an optical repeater device according to a third embodiment of the present invention. The optical repeater device of the third embodiment uses a plurality of (7) single core fibers as transmission fibers. An optical repeater device 101 includes an optical amplifier module 102 and a monitoring control circuit 103. For transmission fibers of an optical transmission system to which the optical repeater device 101 is connected, fibers 304a and 304b in which seven single core fibers are bundled are used as an input and an output.

For the amplifier optical circuit 111, a bundled EDF in which seven single-core EDFs are bundled is used. The amplifier optical circuit 111 is an amplifier optical circuit including an excitation light source (a 980 nm band single-mode semiconductor laser) connected to each core, a fan-out at an input end, and a fan-in at an output end. Seven EDFAs of the related art can also be used in parallel. An MC-EDFA can also be used, but in this case, a fan-in at an input end and a fan-out at an output end are included.

The multiplexer and demultiplexers 313a and 313b of the optical amplifier module 102 respectively include seven multiplexer and demultiplexers 313a-1 to 313a-7 and seven multiplexer and demultiplexers 313*b*-1 to 313*b*-7 for a single core. In the multiplexer and demultiplexers 313*a* and 313*b*, all three ports are seven single-core fibers.

Figure 8:
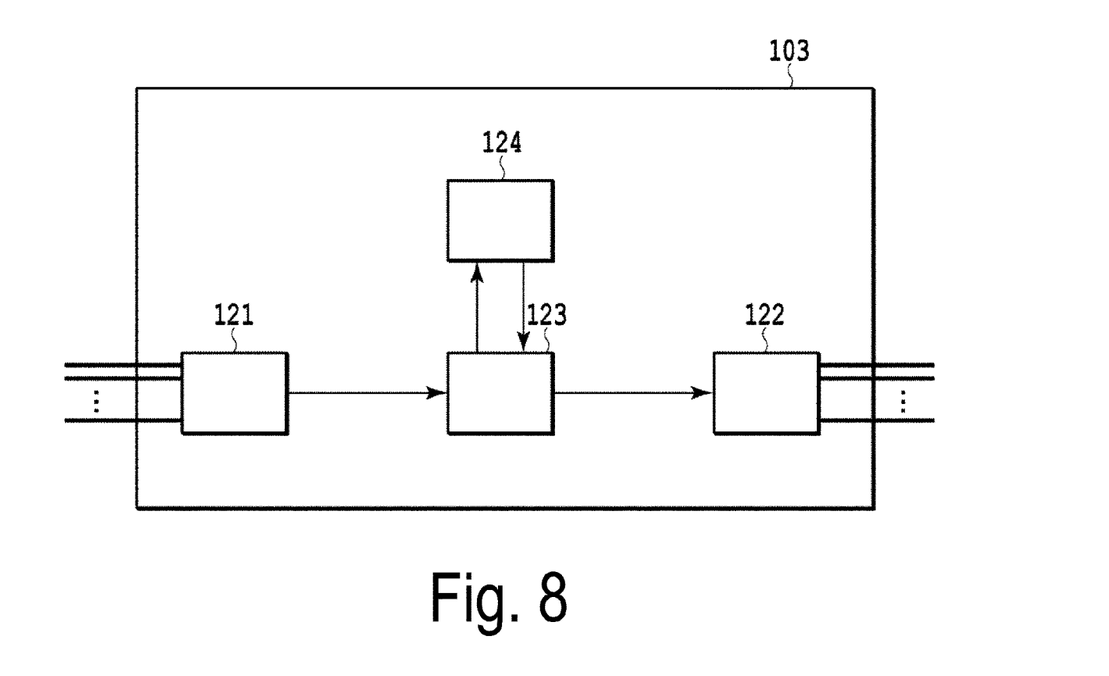
FIG. 8 is a diagram illustrating a configuration of a monitoring control circuit that is used for the optical repeater device of the third embodiment.

FIG. 8 illustrates a configuration of the monitoring control circuit that is used in the optical repeater device of the third embodiment. The multiplexer and demultiplexer 313*a* on the input side of the amplifier optical circuit 111 demultiplexes monitoring control channel light for each of the seven single-core fibers, and transmits the monitoring control channel light to the reception unit 121 of the monitoring control circuit 103 via the seven single-core fibers. The multiplexer and demultiplexer 313*b* on the output side of the amplifier optical circuit 111 multiplexes monitoring control channel light sent from the transmission unit 122 via the seven single core fibers with main signal channel light amplified by the amplifier optical circuit 111 for each of the seven single core fibers.

According to the third embodiment, because the monitoring control channel lights for the respective different cores are collectively processed by one monitoring control circuit, it is possible to reduce the size of the optical repeater device by 60% and to reduce power consumption by 65%, as compared with a case in which monitoring control circuits of the related art corresponding to the number of fibers are used.

The invention claimed is:

1. An optical repeater device comprising:
  an optical amplifier module including an amplifier optical circuit, the amplifier optical circuit including a plurality of amplification cores configured to amplify signal light propagating through different cores, and an optical amplifier control circuit configured to receive detection results from the amplifier optical circuit and generate a control signal directed to an excitation light source; and
  a monitoring control circuit including a reception unit configured to receive monitoring control channel light, a transmission unit configured to transmit the monitoring control channel light, an information determination unit configured to determine whether monitoring control information transmitted by the monitoring control channel light received from the reception unit is for the optical repeater device or for another device, and a monitoring control unit configured to receive the monitoring control information from the another device via the reception unit and the information determination unit and transmit the monitoring control information of the optical repeater device to the another device via the transmission unit and the information determination unit,
  wherein the monitoring control circuit collectively processes the monitoring control channel light for the respective different amplification cores.

2. The optical repeater device according to claim 1, further comprising:
  a multiplexer and demultiplexer to which a transmission fiber having a plurality of cores is connected, the multiplexer and demultiplexer demultiplexing the monitoring control channel light from main signal channel light for each core of the plurality of cores and outputting the monitoring control channel light to the reception unit via the transmission fiber having the plurality of cores.

3. The optical repeater device according to claim 1, further comprising:
  a multiplexer and demultiplexer to which a transmission fiber having a plurality of cores is connected, the multiplexer and demultiplexer demultiplexing the monitoring control channel light from main signal channel light of one of the plurality of cores and outputting the monitoring control channel light to the reception unit via a single core fiber.

4. The optical repeater device according to claim 1, further comprising:
  a multiplexer and demultiplexer to which a transmission fiber having a plurality of single core fibers is connected, the multiplexer and demultiplexer demultiplexing the monitoring control channel light from main signal channel light for each of the single core fibers and outputting the monitoring control channel light to the reception unit via the plurality of single core fibers.

* * * * *